R. W. WOOD.
FLASH TELESCOPE.
APPLICATION FILED FEB. 25, 1919.

1,346,580. Patented July 13, 1920.

Inventor
Robert W. Wood

UNITED STATES PATENT OFFICE.

ROBERT W. WOOD, OF BALTIMORE, MARYLAND.

FLASH-TELESCOPE.

1,346,580.     Specification of Letters Patent.     Patented July 13, 1920.

Application filed February 25, 1919. Serial No. 279,038.

*To all whom it may concern:*

Be it known that I, ROBERT W. WOOD, citizen of the United States, residing at Baltimore, State of Maryland, have invented certain new and useful Improvements in Flash-Telescopese, of which the following is a specification.

The present invention relates to flash signaling and has for its particular object, the designing of a device for transmitting military messages by means of light flashes which are invisible to the enemy, the secrecy of the messages depending upon the very small area covered by the light beam at the distance or receiving station, or in other words, upon the extreme narrowness of the beam.

A further object is to provide an instrument which may be operated with the assurance that the light rays will be accurately projected only on, and visible only from within, a predetermined area.

The device which forms the subject of this invention, is a combination of telescope and flash lamp, the latter being so located within the former as to illuminate only such part of the landscape, &c., as may be selected by the operator in adjusting the instrument, thereby rendering the signals visible only from within the area so illuminated.

A device of this type might not at first appear to be as efficient as a deep parabolic mirror of short focus, as the latter gathers a much greater portion of the light emanating from the source of light and projects it in a parallel beam. This is not the case, however, for as we shorten the focus, we increase the width of the beam due to the fact that the light source has a finite width. Thus, in the reflecting type of signal device having a short focus, we utilize more light, but spread it over a greater area. As a matter of fact, the intensity of the light as seen from the receiving station depends only on the diameter of the objective lens of the telescope, or the mirror in the reflecting type, and the intrinsic intensity of the lamp filament, the focal length of the lens or mirror and the size of the lamp filament *i. e.*, the candle power, being without influence. The flashes are quite as bright, with a single loop filament of say five candle power, as with a large spiral of thirty-six candle power.

Referring to the accompanying drawing forming a part of this application in which like numerals indicate like parts in all the views:—

Figure 1:
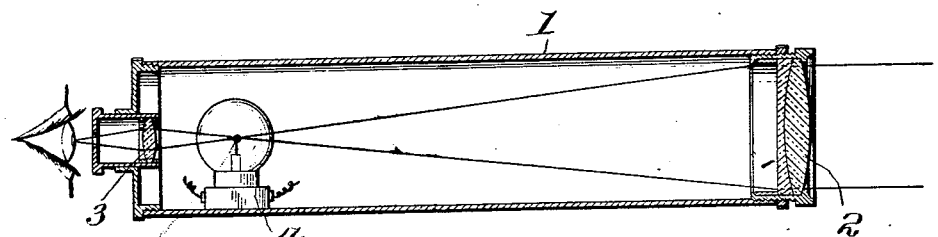
Figure 2:
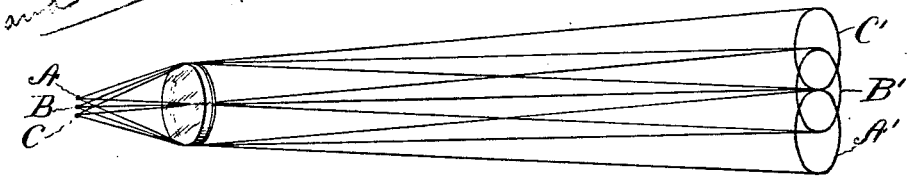
Figure 3:
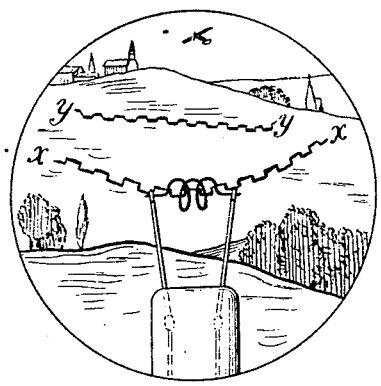

Figure 1 represents diagrammatically a telescope provided with a flash lamp as contemplated by my invention, Fig. 2, a diagrammatical view showing the course taken by the rays of light emanating from certain points in the filament of the flash lamp, and Fig. 3, an image seen through the eye piece of the device, illustrating the manner in which the lamp filament appears superimposed on the image.

The telescope 1 is of conventional form, being provided with an uncemented achromatic objective lens 2 and a double convex eye piece lens 3. Th objective and eye piece lenses are so arranged with relation to each other, as shown in Fig. 1, that they have a common focal point within the telescope. At this common focal point, there is provided a flash lamp 4 by means of which signals may be sent.

It has been found that when a flash lamp or other source of light is placed at the focal point of a telescope objective, the rays of light issuing from said source will be projected by the objective in a very narrow beam, said beam when intercepted by a screen or the like, forming an enlarged illuminated figure conforming to the shape of the source of light. In the case of a nitrogen-filled tungsten lamp with a very short spiral filament, this would be an enlarged figure of the luminous portion of the filament.

When the source of light is located at the focus of the objective, the general course of the rays which issue from several of the infinite points which go to make u pthe luminous portion of a lamp filament or other light source, is shown in Fig. 2. For instance, the light rays from A, B and C after passing through the objective, would if intercepted by a screen, form illuminated spots A', B' and C' respectively. Hence, in the case of the incandescent lamp, where the luminous portion of the lamp filament is the source of light, said filament consisting of an infinite number of such points A, B, and C, the beam of light when intercepted would form a figure corresponding to the lamp filament. Consequently, as the rays of light are projected only on this limited area, they are visible only from points within that area.

With the device shown in Fig. 1, a small image of the object upon which the telescope is focused, will be projected on the focal plane of the objective 2. The filament of the flash lamp 4 is also located in this focal plane. Therefore, on observing through the eye piece 3, the image projected on the focal plane which is common to both the objective and the eye piece lenses, a magnified image of the spiral filament of the lamp 4 will appear superimposed on the image of the object viewed. This is illustrated by Fig. 3 which shows the filament as it appears when viewing a distant landscape through the telescope with the lamp 4 in place. The rays of light emanating from the lamp 4 therefore, are projected only on that portion of the landscape covered by the filament of the lamp.

The operation of the device is as follows:—

Assume that it is desired to establish signal communciation with a front line trench indicated by X—X, Fig. 3, from a signal station at headquarters, without the signals being observed from the enemy's trench, indicated by Y—Y. The instrument can be aimed with absolute accuracy, whereby the distant station or observer in trench X—X is brought into coincidence with the spiral filament of the flash lamp. The lamp is then operated to flash light signals to the distant station, the signals being projected accurately to that station, and visible only within the area which is seen to be covered by the spiral filament in the instrument at the sending station. Care must be taken not to disturb the aim of the telescope when flashing the lamp.

Secret signaling may be accomplished with this device at night, if the operator is certain that the disposition of the enemy's trench is such as to preclude the inclusion of any portion thereof within the spiral of the lamp filament, when the telescope is accurately pointed at a light shown at the receiving station by means of a similar instrument. It is obvious that this instrument can also be used as a telescope for viewing the signals from the distant station in the case of long range work.

If the stations can be established in daylight and the instruments left in position, very little, if any, adjustment is necessary for the night work. This should be done whenever possible. If not possible, the lamp at the front, i. e., pointing away from the enemy, can indicate its position by sweeping a beam of light in the general direction of the other station, say division headquarters. The instrument at the latter station is then aimed at the point at which the flashes due to sweeping appear, and the lamp turned on signaling a code letter. Both the telescope and the receiver at the distant (front) station can then be aimed accurately and communication established.

Aiming of the device at night is greatly facilitated by operating the flash lamp at reduced voltage, so that the filament barely glows a dull red. In this way, the flashes from the distant lamp can be brought into coincidence with the spiral filament immediately without "hunting", otherwise the instrument must be moved about until the filament shows up by the light of the image of the distant lamp.

The telescope inverts the landscape, as a matter of fact, but a little practice with the instrument soon overcomes any difficulty which is felt at first.

It is not desired to confine this invention to the specific details described except as pointed out in the claims, or to the use described, as the same may be readily adapted to use in various fields where it is desirous to locate and establish signal communication between distant points, as in surveying, &c.

What I claim is:

1. An instrument for sending light signals exclusively to a selected area, comprising in combination a telescope barrel, an objective, an eye piece said objective and eye piece being so arranged with relation to each other as to have a common focal plane within said barrel, and a flash lamp within the barrel, having its filament located in said common focal plane.

2. Signaling means comprising in combination, a telescope, the objective and eye piece of which have a common focus, and a flash lamp located at the said common focus.

3. A flash telescope having in combination, an objective, an eye piece having its focus in common with that of said objective, and an electric flash lamp located at said common focus, adapted to be operated at a reduced voltage.

In testimony whereof I have affixed my signature.

ROBERT W. WOOD.